United States Patent [19]

Rader

[11] Patent Number: 5,616,626
[45] Date of Patent: *Apr. 1, 1997

[54] PHENOLIC FOAM COMPOSITION AND USE THEREOF FOR IN PLACE FOAMING

[75] Inventor: Samuel L. Rader, Lewisburg, W. Va.

[73] Assignee: Jiffy Foam, Inc., Newport, R.I.

[*] Notice: The term of this patent shall not extend beyond the expiration date of Pat. No. 5,514,725.

[21] Appl. No.: 571,220

[22] Filed: Dec. 12, 1995

Related U.S. Application Data

[60] Division of Ser. No. 477,821, Jun. 7, 1995, and a continuation-in-part of Ser. No. 328,694, Oct. 25, 1994, Pat. No. 5,432,207.

[51] Int. Cl.⁶ .............................. C08J 9/08; C08G 14/04
[52] U.S. Cl. .......................... 521/94; 521/128; 521/158; 521/164; 521/181
[58] Field of Search ................... 521/94, 128, 158, 521/163, 164, 181

[56] References Cited

U.S. PATENT DOCUMENTS

| 4,427,797 | 1/1984 | Smith | 521/128 |
|---|---|---|---|
| 4,579,876 | 4/1986 | Iliopulos | 521/136 |
| 5,432,207 | 7/1995 | Rader | 521/128 |

*Primary Examiner*—Morton Foelak
*Attorney, Agent, or Firm*—Cushman Darby & Cushman, IP Group of Pillsbury Madison & Sutro, LLP

[57] ABSTRACT

Provided is a composition for making a foam including a reactive phenolic resin, urea, and an isocyanate. Also provided is a method for making the foam and a foam made from the composition.

8 Claims, No Drawings

PHENOLIC FOAM COMPOSITION AND USE THEREOF FOR IN PLACE FOAMING

This is a division of application Ser. No. 08/477,821, filed Jun. 7, 1995, and is a CIP of Ser. No. 08/328,694, filed Oct. 25, 1994 now U.S. Pat. No. 5,432,207.

FIELD OF THE INVENTION

The present invention relates to a composition for producing foamed shaped articles comprised of phenolformaldehyde resin, using carbon dioxide formed in situ as the blowing agent.

BACKGROUND OF THE INVENTION

"In place" foaming is a process in which two reactive components are brought together in a mixing head where they react. The resulting reaction mixture is then transferred to a mold where the mixture is foamed and cured into a solid resin. While this process is known for foams comprised of reactive systems such as polyurethane and polyisocyanurate resins, it has not hitherto been practical to apply it to foams comprised of phenol-formaldehyde resins.

A mixing head for use in carrying out "in place foaming" is described in Fiorentini, U.S. Pat. No. 4,332,335. The head comprises a mixing chamber which communicates with a discharge orifice and first and second ducts which dispense the reactive components into the mixing chamber. Means are provided for regulating the flow of the reactants to the reaction chamber.

Phenol-formaldehyde resins can be produced from partially-reacted phenol-formaldehyde resins known as "resols". Resols are resins which are made by reacting a phenol, normally phenol itself, with formaldehyde, using an excess of formaldehyde. The resulting low polymer or oligomer has reactive methylol groups which can react further to enlarge and cross-link the polymer into a cured, three-dimensional network. If the curing is carried out in the presence of a blowing agent, the product is a phenolformaldehyde foam. It is known to use, e.g., chlorofluorocarbons as blowing agents.

Typically, phenol and formaldehyde are reacted in the presence of a basic catalyst such as sodium hydroxide and triethyl amine, followed by neutralization and distilling off water. The initially produced resin is called an A-stage resin. It is known to add urea to this initial product. The A-stage resin can then be reacted further in the presence of an acid catalyst, during which time some formaldehyde and water are liberated. If urea is present, the formaldehyde, may react with the urea to form bis methylol urea, which can also polymerize.

Typical phenolic resin foams are rigid. To increase the flexibility of these foams, large quantities of elastomers are admixed therein. However, the foam then has the qualities of the elastomers, such as low temperature resistance and emission of toxic fumes when burned. There is a great need for a flexible phenolic resin foam which does not require the use of elastomers.

SUMMARY OF THE INVENTION

An object of the invention is to provide a composition for making a phenolic resin foam, a method of making the phenolic resin foam, and a phenolic resin foam.

Another object of the invention is to provide a flexible phenolic resin foam which does require the use of elastomers. A further object of the invention is to provide a composition and method for making the flexible phenolic resin foam. The above objects and other objects are accomplished by the following.

In accordance with the present invention, a reactive phenol-formaldehyde oligomer, that is to say a resol or A-stage resin, is combined with urea, a catalyst and a reactive isocyanate. The urea and resol react to, inter alia liberate water. The water in turn reacts with the reactive isocyanate, to generate carbon dioxide while the resol is curing. As a consequence, the concurrent polymerization and carbon dioxide-liberating reactions cause carbon dioxide to be entrapped as bubbles in the polymer, as it is cured, thereby producing a foam.

These reactions may be carried out by simply mixing the components, or in a mixing head. When a mixing head is used, preferably, one side of the mixing head is supplied with a liquid containing the resol, surfactants, urea, and the isocyanate component. The other side of the mixing head is supplied with a catalyst.

The foam producing composition can be present as a two, or more, part system. In such a system, the resin and isocyanate are separated from the catalyst. The foam is easily prepared by mixing together the ingredients. Preferably, the composition is present as a two part system in which the first part comprises the phenolic resin, urea, and the isocyanate, and the second part comprises the catalyst. If needed, the first part can further include an emulsifier to facilitate mixing of the phenolic resin and the isocyanate.

The two part systems can also include conventional additives for there known use, including, surfactants, viscosity modifiers, emulsifiers, etc.

A wide variety of reactive phenol aldehyde resins may be used for the present invention. In general, they are the reaction products of a phenol, such as phenol itself and substituted phenols, for example alkyl-substituted phenols, such as cresols and nonyl phenol, paraphenyl phenol and resorcinol, alone or in mixtures of such phenols. The phenol is reacted with an aldehyde, preferably formaldehyde, although other aldehydes may be used such as acetaldehyde and furfurylaldehyde. The phenol and aldehyde are reacted in proportions such that there is an stoichometric excess of aldehyde to phenol, for example 1.75 to 2.25 mols of aldehyde for each mol of phenol. This reaction is normally carried out in the presence of a basic catalyst, for example sodium hydroxide or potassium hydroxide, and triethyl amine may also be present in combination with the hydroxide. Ordinarily, the phenol and base are charged into a reactor initially, and then formaldehyde is added. The mixture is heated to for example 70°–75° C. The heating is continued until a desired molecular weight is achieved, for example measured by could point. Oxalic acid may be added as a scavenger for the sodium or potassium chloride which may be formed during the reaction. When the desired molecular weight is achieved, the mixture is cooled and neutralized, following which water is distilled off to increase solids, for example to 78–82%. Then, the mixture is cooled to, e.g., 50° C. Urea is then added, but not reacted.

The above-described reaction results in the formation of a resin containing aliphatic alcohol groups, methylol groups in the case of formaldehyde. Useful resins are, for example characterized by viscosities of 3,000 cps to 20,000 and a molecular weight of 300 to 600.

For example, the reactive resin can be present in the foam composition in an amount of about 60 to about 92% by weight, preferably, about 70 to about 85% by weight of the total composition.

The second constituent of the foam-forming reaction mixture is urea, which preferably is introduced into the resol in the manner described above. The amount used can vary from 4 to 20%, based on the weight of phenolic resin. As noted above, during further reaction, the urea reacts with formaldehyde. For example, the urea can be present in the foam composition in an amount of about 1 to about 20% by weight, preferably, about 5 to about 10% by weight of the total composition.

The isocyanate constituent can be for example an isocyanate which does not react with the other components until the reaction temperature is elevated, for example to 130° F. Thus, a blocked isocyanate may be used. Preferably, isocyanate is PAPI, i.e., a polyphenylenemethylenepolyisocyanate having the formula:

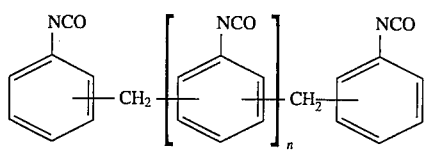

Several different products of this formula can be used, both TDI and polymer varying in average. molecular weight from 200 to 500, viscosities from 200 to 4,000 cps, functionalities from 2–4 and isocyanate equivalent wt. range from 78.5–150.

For example, the isocyanate can be present in the foam composition in an amount of about 1 to about 15% by weight, preferably, about 1 to about 5% by weight of the total composition.

It is possible to slow down the reaction, for example, by using a blocked TDI or MDI isocyanate. However, as water is not liberated until the A-stage resin-described above starts to polymerize in the presence of an acid catalyst, PAPI can be used in unblocked form.

The density of the foam can be varied by adjusting the molecular weight of the phenolic resin. A higher molecular weight phenolic resin will result in a denser foam. The density of the foam is easily adjusted to within about 1 pcf using the molecular weight of the phenolic resin. However, if a more precise density of the foam is desired, the density of the foam can be fine tuned by varying the amount of isocyanate. By increasing the amount of isocyanate present, the amount of carbon dioxide produced will be increased, causing the density to be reduced. If amounts of isocyanate above 5% are used, preferably the foam is kept under pressure. For example, if about 15% of isocyanate is used, a pressure of 200 psi can be applied to the foam to prevent frothing.

An open cell foam can be made by adding compounds which lyse the cell walls, which include, for example, dodecylbenzene sulfonic acid, sodium ether lauryl sulfate, and sodium sulfosuccinate.

The flexibility of the foam can be increased by prolonging the curing time of the foam. The curing time is the time measured from the when the mixed foam composition is charged into the mold until when the produced foam is no longer tacky. For example, the rigid foams produced in the examples below cured in about 30 seconds to about 2 minutes, with the compositions containing lower molecular weight phenolic resins curing closer to 30 seconds and the compositions containing higher molecular weight phenolic resins curing closer to about 2 minutes. If the amount or type of catalyst, such as blocking the catalyst, is adjusted to provide a curing time of greater than 2 minutes the resulting foam will be more flexible. Another way of prolonging the curing time is to add triethanolamine. For example, the flexible foams produced below in examples 11 and 12 had a curing time of about 8 minutes.

The polymerization and foaming reaction may be carried out in the presence of a catalyst, for example an acid catalyst. Suitable catalysts include phenol sulfonic acid, toluene sulfonic acid (TSA), xylene sulfonic acid (XSA), sulfonic acid and phosphoric acid which may be used independently and in mixtures. The acid catalyst preferably is diluted with methanol. A particularly preferred catalyst is a mixture of toluene sulfonic acid and phenol sulfonic acid in a 30/70 blend. This mixture gives a better curing rate and the closed cell content of the foam was higher. In turn, this increased the flex modulus compression rating, and also shear resistance. This catalyst also gives a stronger, less friable foam, and this effect is believed to be caused by utilizing more of the water liberated in the reaction and converting it to carbon dioxide. Other catalysts were used in some cases because they reduced oxidation of metal molds. Another preferred catalyst is a 20/80 blend of XSA/TSA. The amount of catalyst added may be about 1 to about 20%, preferably, 5 to 20% based on the weight of the reaction mixture.

The ratio of the reactive phenoxy resin to the catalyst, for example, can be in the range of about 7:1 to about 14:1, and more preferably about 10:1.

In addition to the reactive constituents, it is desirable to include surface active agents which assist in the foaming action, i.e., in stabilizing the foam. There are many surfactants which can be used for this purpose, for example polysorbates which have an HLB greater than 11. Other fatty acids may be used such as those having the structure:

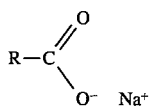

Other surfactants which can be used are the sodium dialkyl sulfosuccinates having the structure:

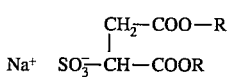

where is an alkyl group.

Nonionic surfactants which can be used are N-alkyl phenyl polyoxyethylene ethers of the formula:

where R is an alkyl group.

Another useful group of surfactants are the dimethyl(polysiloxane) copolymers. There are a wide range of these products which can be used. Examples include General Electric Co.'s SF1188, Union Carbide's L-5340 and Dow Corning's DC 193 and DC 201.

In accordance with a preferred embodiment of the invention, an anionic surfactant and a cationic surfactant are added. Surfactants which have been used successfully include polysorbate 40 polyoxyethylene 20 monopalmitate, acid no. 2.2, hydroxyl no. 89–105 and DC 193 dimethylpolysiloxane. A particularly useful mixture comprises DC 193 and SF 1188 in a 20/80 wt./wt. mixture.

The concentration of surfactant varies in accordance with the surfactant, but generally is in the range 0.3 to 4%. The evaluation of potential surfactants and the amount of surfactant is carried out in a manner similar to that in other foaming processes.

Fillers may also be added such as aluminum trihydrate which provides fire retardant properties, but it can be omitted if not needed for a particular application.

In addition, microspheres may be added, as is known for foamed products. Microspheres are added to provide higher insulation (R factor) properties.

A particularly important feature of the present invention is that the foaming reaction reduces the level of residual formaldehyde in the product. This, a sample of the foamed product was found to have a residual formaldehyde level of 0.9 parts per billion. This value was determined by sampling air as it was released from the foam using a calibrated pump. The gaseous products from the foam were flushed into an impinger to collect the formaldehyde released over an eight-hour period. The resulting solution was then analyzed for formaldehyde using the chemistry of NIOSH Method 3500. While the reason for the reduced formaldehyde levels is not known, it is believed to arise from reaction between formaldehyde and primary amine formed when the polyisocyanate reacts with water, according to the reaction:

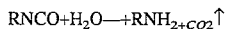

$$RNCO + H_2O \rightarrow RNH_{2} + CO_2 \uparrow$$

The following formulation has been found to be particularly useful for a closed cell foam:

A. Phenolic Resin: 100 parts

B. Anionic surfactant: 1–3 parts

C. Ionic surfactant: 1–3 parts

D. PMDI resin: 0.5 to 1.5 parts

E. Catalyst 5 to 9 parts

F. Aluminum trihydrate: 10 parts

G. Microspheres 2 to 7 parts, if used.

pH is 5.5–6.0.

In a batch process, all of the components are added to a mixing vessel and combined. In a continuous process, the components are supplied to a mixing head, all of the components except the catalyst being supplied to one side of the head, and the catalyst being supplied to the other side. The foam emerging from the head is deposited on a continuous belt, moving at between 2 and 20 feet per minute.

The phenolic resin, A, is a phenol-formaldehyde A-stage resin which contains 10.3% urea, based on the weight of phenol. It is obtained in the manner described above, using 1.75 to 2.25 moles formaldehyde for each mole of phenol and a basic catalyst (NaOH or KOH). The mixture of phenol and formaldehyde is reacted until a molecular weight of 350 400 is achieved, following which the mixture is neutralized with oxalic acid, which also scavenges leachable sodium or potassium chloride. After distillation, 4 to 14% urea is added, based on the weight of the phenol. Since the urea is present in the form of beads, heat is applied to dissolve it. The reactivity of the resin mixture is adjusted in relation to the density desired for the final product.

The surfactant used is a mixture of polysorbate 40 polyoxyethylene 20 sorbitan monopalmitate, acid no. 2.2, hydroxyl no. 89–104, sophinocation no. 41–52, HLB 15.6, and DC-193 dimethylpolysiloxane, Union Carbide 1-5340 of Union Carbide or SF-1188 of General Electric.

The isocyanate which is used is PAPI having an NCO content of 30.8, average molecular weight of 375, functionality of 3, isocyanate equivalent weight of 136.5.

The catalyst is phenol sulfonic acid cut with methanol. Total acidity is 19.3, wt % phenol sulfonic acid is 66.8, specific gravity 1.3140, wt. % $H_2SO_4$ 0.58. Toluene sulfonic acid may also be used. Weight per cent of catalyst is 5–9%, based on the weight of the phenolic resin.

For an open cell foam, the phenolic resin should have a molecular weight of 300 to 600. The amount of urea is 4 to 14%, based on the phenolic resin. Surface active agents used include a first type to reduce surface tension between cells, such as dodecyl benzene sulfonic acid, sodium lauryl sulfate, acetyl trimethyl ammonium bromide and sodium sulfosuccinate. A mixture of these may be used. In addition, a surfactant is used for nucleation of the cell site, and to control cell size. Suitable materials are polyoxyethylene 20, sorbitan mono palmitate, dimethylpolysiloxanes L5340, S1 1188, and DC 193. Mixtures of these may be used. Isocyanates which can be used are PAPI from Union Carbide and Mobay's Lupranite M205. The catalyst may be phenol sulphonic acid cut with methanol, total acidity 19.3 wt %, PSA 66.0, specific gravity 1.3140, Wt % $H_2SO_4$, 0.58. 4 to 14% catalyst is used.

The specifications for particularly useful urea modified phenolic resins is illustrated in the following table:

| Resin | Reactivity[1] | Urea Content (%) |
|---|---|---|
| HRJ 11761 | 280–310° F. | 8.3 |
| HRJ 12667 | 180–210° F. | 10.3 |
| GP 541053 | 300–320° F. | 8.3 |
| GP | 200–220° F. | 7.3 |
| HRJ 4173h | 165–185° F. | |

[1]Peak exotherm temperature when resin and urea cured with catalyst but no isocyanate The following table illustrates the performance of samples of foam made from these resins:

| Resin | Reactivity | PAPI (Wt %) | Urea (Wt %) | Foam Density Pounds/ft³ |
|---|---|---|---|---|
| HRJ 12667 | 180–220° F. | 1.5 | 10.3 | 12 |
| HRJ 11761 | 280° F. | 1.5 | 8.3 | 1.6 |
| GP | 305° F. | 1.5 | 8.3 | 1.4 |
| GP | 305° F. | 3 | 8.3 | 1 |
| HRJ 12667 | 180° F. | 1 | 10.3 | 20 |

The data gives an approximate range of the densities which can be achieved by the selection of the resin according to its reactivity. Fine tuning of density can be achieved by adjusting the proportion of PMDI. Examples of densities which have been achieved successfully are:

| Open Cell | | Closed Cell | |
|---|---|---|---|
| Sample | Density pounds/ft³ | Sample | Density pounds/ft³ |
| A | 0.8 | A | 1.0 |
| B | 1.0 | B | 2.0 |
| C | 1.5 | C | 2–28 |

DETAILED DESCRIPTION OF THE PREFERRED EMBODIMENTS

The invention is illustrated by the following non-limiting examples, in which all parts are by weight unless indicated otherwise.

Example 1

Resin HRJ 12667—500 grams

PMDI 2 grams

Tween 8 grams
Silicone surfactant—3 grams
Glycerine—5 grams
Catalyst (PSA/TSA¹)—50 grams
¹ toluene sulfonic acid/phenol sulfonic acid (30/70)

The first five components were mixed for 3 minutes, and then the catalyst was added, and mixed in for 1 minute. The reaction mixture was then dumped into a mold. A foam density of 20 pounds per cubic foot (hereinafter "pcf") was obtained.

Example 2

An open cell foam was made from the following formulation:
Resin GP 541053 (Reactivity 305° F.)—275 grams
Resin HRJ 12667—25 grams
Tween 40—5 grams
SF 1188—1 gram
Dodecylbenzene sulfonic acid—5.5 grams
Sodium ether lauryl sulfate—5.5 grams
PMDI—5 grams
Phenol sulfonic acid—30 grams.

The foam was relatively dense, and a larger amount of PMDI was added to decrease the density, in the following formulation:
Resin GP 541053—275 grams
Resin HRJ 12667—25 grams
Tween 40—6 grams
SF 1188—1 gram
Dodecylbenzene sulfonic acid—5.5 grams
Sodium ether lauryl sulfate—5.5 grams
PMDI—7 gram
Phenol sulfonic acid—30 grams.

The last formulation was repeated, except that the amount of SF 1188 was increased to 3 grams.

Example 3

An open cell foam was produced from the following formulation, the proportion of silicone being increased to reduce cell size:
Resin HRJ 11761—275 grams
Resin HRJ 12667—38.1 gram
Tween 40—6.4 grams
SF 1188/15340—4 grams/2 grams
Dodecylbenzene sulfonic acid—6 grams
Sodium ether lauryl sulfate—6 grams
Rhodaquat—6 grams
Sodium Sulfosuccinate—5.5 grams
PMDI—7 grams
Phenol sulfonic acid—36 grams Example 4

A foam was produced from the following formulation:
Resin HRJ 11761—400 grams
Resin HRJ 12667—200 grams
Tween 40—18 grams
DC 193—9 grams
SF 1188—6 grams
PMDI—22 grams
Phosphoric acid (85%)—75 grams Example 5

A foam was produced from the following formulation:
Resin HRJ 11761—400 grams
Resin HRJ 12667—200 grams
Tween 40—22 grams
DC 193—9 grams
SF 1188—6 grams
PMDI—22 grams
Phosphoric acid (85%)—75 grams Example 6

A foam was made from the following formulation:
Resin HRJ 11761—400 grams
Resin HRJ 12667—200 grams
Tween 40—18 grams
DC 193—9 grams
SF 1188—6 grams
PMDI—22 grams
Phosphoric acid (85%)—55 grams Example 7

A foam was made from the following formulation:
Resin HRJ 11761—400 grams
Resin HRJ 12667—200 grams
Tween 40—18 grams
DC 193—9 grams
SF 1188—6 grams
PMDI—22 grams
Phosphoric acid (85%)—85 grams Example 8

A foam was made from the following formulation:
Resin GP 541053—500 grams
Resin HRJ 12667—100 grams
Tween 40—12 grams
Silicone 407—2178—26 grams
Dodecylbenzene sulfonic acid—12 grams
Sodium ether lauryl sulfate—16 grams
Sodium sulfosuccinate—12 grams
PMDI—9 grams
Phenyl sulfonic acid—72 grams Example 9

A rigid phenolic foam was made from the following formulation:
(a) Resin GP 541053—100 parts
(b) PMDI—1.5 parts
(c) tween polysorbate—5 parts
(d) 20% wt. XSA/80% wt. TSA—10 parts
(e) DC 193—7 parts
(f) gamabutylactone—3 parts Components a, b and c were combined as part I. Components d, e and f were combined as part II. Parts I and II were mixed together and charged into a mold. A rigid foam was produced.

The density of the foam can be varied by adjusting the molecular weight of the phenolic resin. A higher molecular weight phenolic resin will result in a denser foam. The density of the foam is easily adjusted to within about 1 pcf by the molecular weight of the phenolic resin. However, is a more precise density of the foam is desired, the density of the foam can be fine tuned by varying the amount of isocyanate. By increasing the amount of isocyanate present, the amount of carbon dioxide produced will be increased, causing the density to be reduced. If amounts of isocyanate above 5% are used, preferably the foam is kept under pressure. For example, if about 15% of isocyanate is used, a pressure of 200 psi can be applied to the foam to prevent frothing.

An open cell foam can be made by adding compounds which lyse the cell walls, which include, for example, dodecylbenzene sulfonic acid, sodium ether lauryl sulfate, and sodium sulfosuccinate.

The flexibility of the foam can be increased by prolonging the curing time of the foam. The curing time is the time measured from the when the mixed foam composition is charged into the mold until when the produced foam is no longer tacky. For example, the rigid foams produced above cured in about 30 seconds to about 2 minutes, with the compositions containing lower molecular weight phenolic resins curing closer to 30 seconds and the compositions containing higher molecular weight phenolic resins curing closer to about 2 minutes. If the amount or type of catalyst is adjusted to provide a curing time of greater than 2 minutes the resulting foam will be more flexible. Another way of prolonging the curing time is to add triethanolamine. The following Examples had curing times of about 8 minutes.

Example 10

A flexible foam was made from the following formulation:

(a) Resin GP 541053—500 grams
(b) PMDI—9 grams
(c) triethanolamine—15 grams
(d) 20% wt. XSA/80% wt TSA—25 grams
(e) DC 193—35 grams
(f) polysorbate—5 grams
(g) butylactone—15 grams Components (a), (b) and (f) were combined to form part I. Components (c), (d), (e) and (g) were combined to form part II. Parts I and II were mixed together for about 30 seconds and then charged into a mold. The foam rise time was 1 minute and 30 seconds. The foam density was 2 pcf. The flexibility of the foam was excellent.

Example 11

A flexible foam was made from the following formulation:

(a) Resin GP 541053—500 grams
(b) PMDI—9 grams
(c) polysorbate—7 grams
(d) triethanolamine—10 grams
(e) 20% xylene sulfonic acid / 80% toluene sulfonic acid—50 grams
(f) DC 193—35 grams
(f) butylactone—15 grams Components (a), (b) and (c) were combined to form part I. Components (d), (e), (f) and (g) were combined to form part II. Parts I and II were mixed together for about 1 minute and then charged into a mold. The foam rise time was about 40 seconds. The foam density was 2 pcf. The flexibility of the foam was excellent, but less than the foam of Example 10.

The foams made according to the present invention exhibit significantly greater resistance to pressure because of the thicker cell walls, than conventional phenolic resin foams.

The foams made according to the present invention exhibit a very high temperature resistance, for example, at least 90% integrity of a phenolic foam made according to Example 9 was maintained to a temperature above 450° F. Thus, the phenolic resin foams according to the present invention do not require a flame retardant. However, if desired, a flame retardant can be included, for example aluminum trihydrate.

In contrast, typical urethane foams, containing flame retardants and fillers to increase temperature resistance, lose integrity at temperatures of at most 250°.

Furthermore, when the phenolic foams made according to the present invention are burned, only carbon dioxide and water are given off, which are non-toxic. In contrast, typical urethane foams give off toxic fumes, such as hydrogen cyanide, when they are burned.

Phenolic foams of different density were made according to Example 9 above and sent to an independent lab, American Foam Technologies, for testing. Using the ASTM E-84 fire test method, the phenolic foams according to present invention exhibited a flame spread in the range of 10–15 and a smoke density of 5. This data indicates that the phenolic foams according to the invention are significantly greater resistance to flame than urethane foams which typically only have a flame spread of around 27 and a smoke density in the 60's.

The thermal expansion of the phenolic foams made according to Example 9 was also tested, and ranged from 38.4 ppm/° C. to 40.9 ppm/° C. This data demonstrates that the size of the phenolic foams according to the present invention are affected less by changes in temperature than conventional urethane foams.

The resistance of the phenolic foams made according to Example 9 to chlorinated solvents, acids, and bases was also tested. The phenolic foams did not swell or break down when exposed to chlorinated solvents, acids and bases. In contrast, conventional urethane foams readily swell when exposed to chlorinated solvents.

While the invention has been described in detail and with reference to specific embodiments thereof, it will be apparent to one of ordinary skill in the art that various changes and modifications can be made therein without departing from the spirit and scope thereof.

What is claimed is:

1. A process for making a flexible foamed product comprising the steps of:

reacting a reactive phenolic resin, urea, an isocyanate, and a catalyst for polymerizing the phenolic resin, whereby water is formed and generates carbon dioxide by reaction of the water with said isocyanate.

2. A process as set forth in claim 1 in which the reactive phenolic resin is made from a reaction mixture containing phenol and formaldehyde, in proportions of about 1.75 to 2.25 moles formaldehyde for each mole of phenol.

3. A process as set forth in claim 1 in which the isocyanate is polyphenylenemethylenepolyisocyanate.

4. A process as set forth in claim 1, wherein the catalyst is an acid catalyst.

5. A process as set forth in claim 1, wherein the catalyst is selected and is present in an amount to provide a curing time greater than about 2 minutes.

6. A process as set forth in claim 1, wherein the catalyst is selected and is present in an amount to provide a curing time greater than about 5 minutes.

7. A process as set forth in claim 1, wherein the catalyst is selected and is present in an amount to provide a curing time of about 8 minutes.

8. A phenolic resin foam made by the method of claim 1.

* * * * *